United States Patent
Lam

(10) Patent No.: US 11,372,270 B2
(45) Date of Patent: Jun. 28, 2022

(54) OPTICAL LIMITERS WITH THERMOCHROMIC MATERIAL AND NANOSTRUCTURES FOR FACILITATING APERTURE PROTECTION

(71) Applicant: The Boeing Company, Chicago, IL (US)

(72) Inventor: Tai Anh Lam, Renton, WA (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 16/208,519

(22) Filed: Dec. 3, 2018

(65) Prior Publication Data

US 2020/0174287 A1     Jun. 4, 2020

(51) Int. Cl.
   *G02F 1/01*    (2006.01)
   *B64C 1/14*    (2006.01)
   *E06B 9/24*    (2006.01)

(52) U.S. Cl.
   CPC .......... *G02F 1/0147* (2013.01); *B64C 1/1484* (2013.01); *E06B 9/24* (2013.01);
   (Continued)

(58) Field of Classification Search
   CPC ......... G02B 5/008; G02B 5/22; G02F 1/0147; G02F 1/17; G02F 1/19; G02F 2202/14;
   (Continued)

(56) References Cited

U.S. PATENT DOCUMENTS 8,345,364 B2    1/2013  Liberman et al.
2010/0309539 A1*  12/2010  Kaye .................. G02F 1/174
                                                    359/288
(Continued)

FOREIGN PATENT DOCUMENTS

WO    WO 2008/087077    7/2008
WO    WO 2010/141168    12/2010
WO    WO 2018/034621    2/2018

OTHER PUBLICATIONS

Vella et al., "Experimental Realization of a Reflective Optical Limiter", Physical Review Applied, 2016, 7 pages, American Physical Society.
(Continued)

*Primary Examiner* — Mahidere S Sahle
(74) *Attorney, Agent, or Firm* — Haynes and Boone, LLP

(57) ABSTRACT

Various techniques provide systems and methods for facilitating aperture protection. In one example, a system for facilitating aperture protection is provided. The system includes an optical limiter device. The optical limiter device includes a thermochromic material and a plurality of nanostructures, where each of the nanostructures is in contact with a portion of the thermochromic material. At least a subset of the nanostructures is configured to receive incident light and generate heat in response to the incident light. At least a portion of the thermochromic material is configured to transition from a first state to a second state in response to the heat and block the incident light when the portion is in the second state. The portion is configured to transition from the second state back to the first state when the portion cools, such as upon removal of the incident light. Related methods and products are also provided.

20 Claims, 6 Drawing Sheets

(52) U.S. Cl.
CPC .. *E06B 2009/2417* (2013.01); *G02F 2202/30* (2013.01); *G02F 2202/36* (2013.01)

(58) Field of Classification Search
CPC ............. G02F 2202/36; G02F 2203/10; G02F 2203/52
USPC ......... 359/240, 288, 888; 977/773, 834, 902
See application file for complete search history.

(56) References Cited

U.S. PATENT DOCUMENTS

| | | |
|---|---|---|
| 2013/0342888 A1 | 12/2013 | Donval et al. |
| 2019/0094574 A1* | 3/2019 | Tanielian ............... G02F 1/3523 |
| 2019/0179176 A1* | 6/2019 | Hu ............................ B32B 5/32 |

OTHER PUBLICATIONS

Jin et al., "Later-by-layer assembled PMMA-SH/CdSe—Au nanocomposite thin films and optical limiting property", RSC Advances, Mar. 2, 2016, 8 pages, The Royal Society of Chemistry.

\* cited by examiner

OPTICAL LIMITERS WITH THERMOCHROMIC MATERIAL AND NANOSTRUCTURES FOR FACILITATING APERTURE PROTECTION

BACKGROUND

Technical Field

The present application generally relates to aperture protection and, more specifically, to optical limiters with thermochromic material and nanostructures for facilitating aperture protection.

Related Art

Proliferation of easily obtainable and affordable sources of light, such as laser pointers, has created a threat to apertures such as human eyes and sensors, since such sources of light may be utilized to blind (e.g., temporarily blind) the eyes, and/or damage and/or saturate the sensors. For example, light that is shone through a window of an aircraft vehicle may impact a pilot's ability to navigate the vehicle and may potentially lead to serious consequences.

Unfortunately, many conventional aperture protection techniques are slow to react to incident light and/or unreliable in their reaction, cause undesirable tinting/coloration, have high cost, and/or require the incident light to be of a high irradiance prior to activating an aperture protection mechanism. Therefore, there is a need for an improved approach for facilitating aperture protection.

SUMMARY

In accordance with various embodiments further discussed herein, optical limiter devices are provided for facilitating aperture protection from potentially harmful light. In this regard, the optical limiter devices may be utilized to prevent potentially harmful light from reaching one or more apertures, which may include human eyes, sensors, and/or multi-functional structures. In general, whether incident light is considered to be potentially harmful is generally application specific and may be based on a frequency and an irradiance associated with the light. The optical limiter device may provide wide bandwidth protection, high speed response to potentially harmful light, quick recovery from the potentially harmful light, and transparency for light that is not potentially harmful.

In some embodiments, an optical limiter device includes a thermochromic material and nanostructures in contact with the thermochromic material. In response to potentially harmful light, nanostructures illuminated by the potentially harmful light capture and amplify an electric field of the potentially harmful light. Such capturing and amplifying of the electric field may involve the nanostructures coupling to the light, absorbing the light, and converting the absorbed light into heat. Since each nanostructure is in contact with a respective portion of the thermochromic material, the heat generated by the nanostructures in response to the light causes heating of the portions of the thermochromic material local to these nanostructures (e.g., via conduction).

When a temperature of the thermochromic material rises above a phase change temperature of the thermochromic material, the thermochromic material transitions from a transparent state that allows passage of light to an opaque state. Localized heating of the thermochromic material causes transition of localized portions of the thermochromic material. Portions of the thermochromic material that transition to the opaque state in response to the localized heating scatter the potentially harmful light to prevent the potentially harmful light from reaching the aperture(s). In an aspect, opaqueness of the transitioned portions of the thermochromic material facilitates absorption of the potentially harmful light by these transitioned portions, thus providing a positive feedback mechanism that helps to expand the opaque portions and facilitate mitigation of the potentially harmful light. Transitions to the transparent state are reversible. In this regard, when the potentially harmful light is removed (and absent any additional potentially harmful light), the thermochromic material cools down and, once its temperature is below the phase change temperature, reverts back to its transparent state.

According to an embodiment, a system for facilitating aperture protection is provided. The system includes an optical limiter device. The optical limiter device includes a plurality of nanostructures. At least a subset of the plurality of nanostructures is configured to receive incident light and generate heat in response to the incident light. The optical limiter device further includes a thermochromic material. Each of the plurality of nanostructures is in contact with a respective portion of the thermochromic material. At least a portion of the thermochromic material is configured to transition from a first state to a second state in response to the heat generated by the subset of the plurality of nanostructures and block the incident light when the portion of the thermochromic material is in the second state.

According to another embodiment, a method of making the system includes providing a substrate layer. The method further includes disposing the thermochromic material on the substrate layer. The method further includes providing the plurality of nanostructures such that each of the plurality of nanostructures is in contact with the thermochromic material. The method further includes engaging the optical limiter device with one or more engagement elements configured to receive the optical limiter device.

According to another embodiment, a method for facilitating aperture protection is provided. The method includes receiving, by at least a subset of a plurality of nanostructures, incident light, where each of the plurality of nanostructures is in contact with a respective portion of a thermochromic material. The method further includes generating, by the subset of the plurality of nanostructures, heat in response to the incident light. The method further includes transitioning at least a portion of the thermochromic material from a first state to a second state in response to the heat generated by the subset of the plurality of nanostructures. The method further includes blocking, by the portion of the thermochromic material, the incident light when the portion of the thermochromic material is in the second state.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
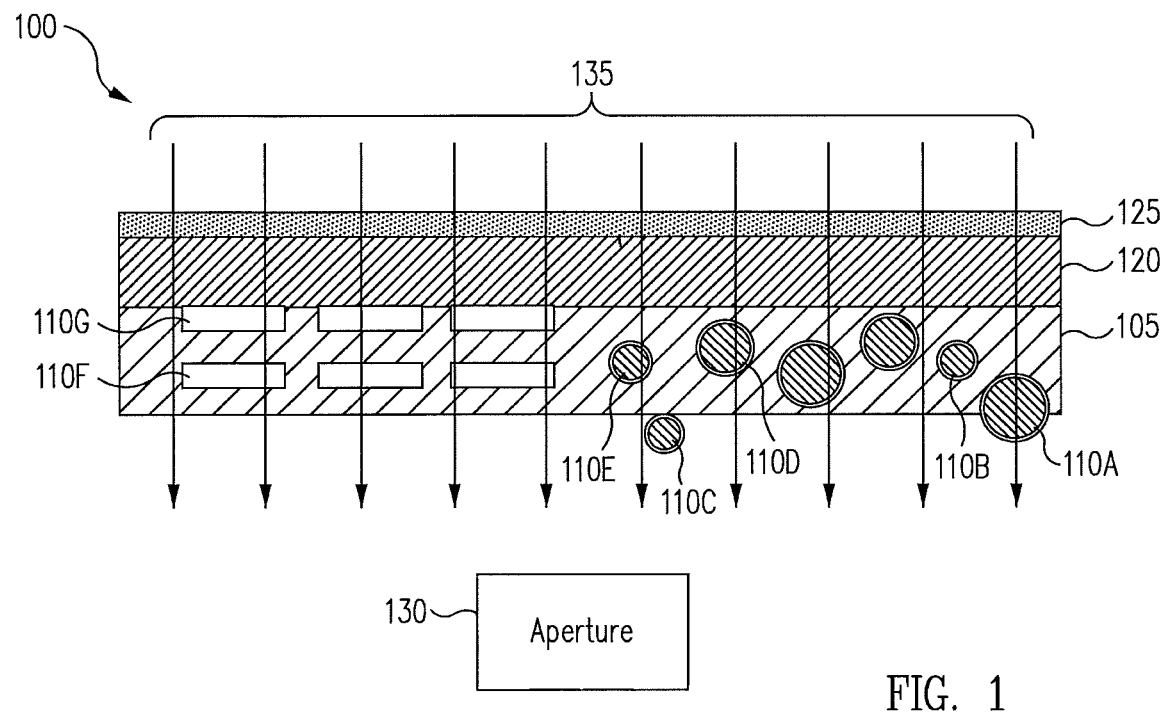
FIG. 1 illustrates an optical limiter device for facilitating aperture protection in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. It is noted that sizes of various components and distances between these components are not drawn to scale in the drawings. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate aperture protection. In some embodiments, to facilitate aperture protection, an optical limiter device is provided to protect one or more apertures from potentially harmful light. In some cases, the optical limiter device may be implemented (e.g., positioned) in front of an aperture to prevent the potentially harmful light from reaching the aperture while allowing other light to pass through and reach the aperture. For example, apertures may include human eyes, sensors, and/or multi-functional structures. A multi-functional structure may include sensors and/or other apertures (e.g., multi-functional apertures) embedded in the structures. Absent the optical limiter device, the potentially harmful light may blind the eyes, and/or damage and/or saturate the sensors.

In an embodiment, the optical limiter device may be provided in a vehicle (e.g., terrestrial, naval, aerial, and/or space vehicles), sensors (e.g., radar system), wearable device (e.g., glasses, safety glasses, goggles, nightvision goggles, visor), and/or generally in any system in which aperture protection may be implemented such as a multi-functional structure or multi-functional aperture. In some cases, the optical limiter device may be coupled to a transparent substrate of a system to facilitate protection of the system. The transparent substrate may include glass, quartz, polycarbonate, and/or other transparent material. As an example, the optical limiter device may be provided on a windshield of an aircraft vehicle or provided as a coating on eyewear to selectively pass light. As another example, the optical limiter device may be provided as the windshield of the aircraft vehicle. When used in an aircraft vehicle, the optical limiter device may be utilized to protect pilots and/or optical equipment against incident light, which may be aimed at the pilots and/or optical equipment (e.g., such as in a laser attack).

The optical limiter device includes a thermochromic material (e.g., also referred to as a thermochromic medium) and nanostructures in contact with the thermochromic material. In an aspect, the nanostructures may also be referred to as resonant structures or light concentrators. The nanostructures may be on a surface of the thermochromic material, partially embedded within the thermochromic material, completely embedded within the thermochromic material, and/or generally positioned in contact with at least a portion of the thermochromic material. The thermochromic material is a phase change material that changes phase in response to a change in temperature of the thermochromic material. The thermochromic material is in a transparent state (e.g., also referred to as transparent phase) when at a temperature below a phase change temperature and in an opaque state (e.g., also referred to as an opaque phase, a reflective state/phase, or a metallic state/phase) when at a temperature above the phase change temperature. The phase change temperature may be referred to as a threshold temperature of the thermochromic material. In an embodiment, a thermal hotspot formed in a portion of the thermochromic material raise a temperature of the portion. When the temperature rises above the phase change temperature, the portion transitions from the transparent state that allows light to pass through to the opaque state that blocks light.

Nanostructures in the thermochromic material are utilized to form thermal hotspots in the thermochromic material. To form such thermal hotspots, a sequence of reactions associated with the optical limiter device may be followed. In some aspects, nanostructures illuminated by potentially harmful light capture and amplify an electric field of the potentially harmful light. In this regard, the nanostructures operate as light concentrators. Such capturing and amplifying of the electric field may involve the nanostructures coupling to the light, absorbing the light, and converting the absorbed light into heat. As such, the absorbed light raises the temperature of the nanostructures. Since each nanostructure is in contact with a respective portion of the thermochromic material, the heat generated by the nanostructures in response to the light causes heating (e.g., via conduction) of the portions of the thermochromic material local to these nanostructures. In an aspect, the thermal hotspots refer to the heated nanostructures and/or the corresponding heated portions of the thermochromic material.

The localized heating of the thermochromic material may cause transition of these localized portions of the thermochromic material from the transparent state to the opaque state. In this regard, each portion of the thermochromic material that is heated to a temperature above the phase change temperature of the thermochromic material transitions from the transparent state to the opaque state. The transitioned portion(s) of the thermochromic material formed in response to the localized heating may scatter the potentially harmful light. In this regard, the portions of the thermochromic material that are heated correspond spatially with the nanostructures illuminated by the potentially harmful light, such that the portions of the thermochromic material that transition to the opaque state coincide with the propagation path of the potentially harmful light to allow reflection (e.g., scattering) of the potentially harmful light. In an aspect, the opaqueness of the transitioned portions of the thermochromic material facilitates absorption of the potentially harmful light by these transitioned portions, thus providing a positive feedback mechanism that helps to expand the opaque portions and facilitate mitigation of the potentially harmful light. As facilitated by the positive feedback, the thermal hotspots may quickly expand and coalesce with neighboring thermal hotspots to effectively form a continuous, reflective layer (e.g., a locally reflective mirror) that scatters the potentially harmful light.

The transitions to the transparent state are reversible. In this regard, when the potentially harmful light is removed (and absent any additional potentially harmful light), the thermochromic material cools down (e.g., the thermal hotspots disappear) and, once its temperature is below the phase change temperature, transitions to its transparent state. In some cases, the thermochromic material reverts to its original temperature (e.g., temperature prior to the localized heating). As such, the opaque portions of the thermochromic material may be considered transient scattering centers that are induced by the potentially harmful light and disappear once the light is removed. In an embodiment, to facilitate cool down, the thermochromic material may have a thickness approximately between 10 nm to 500 nm. A thinner thermochromic material generally heats up and cools faster than a thicker thermochromic material. For some applications, a material system formed by the nanostructures and the thermochromic material is provided to allow a duration of less than 1 µs for transitioning from the transparent state to the opaque state in response to potentially harmful light, and/or a duration of less than 1 µs for reverting from the opaque state back to the transparent state. In some cases, a duration of around 1 ms for transitioning from the transparent state to the opaque state may be sufficient to avoid the potentially harmful light from being observed at the aperture (e.g., human eyes).

In addition to scattering the potentially harmful light by way of absorption of the light by nanostructures, nanostructures may couple to the light and scatter the light. Such scattering may directly scatter the potentially harmful light (e.g., without involving heating of the thermochromic material) to prevent the potentially harmful light from reaching the aperture. In some cases, such scattering may also induce heating of portions of the thermochromic material (e.g., via heating of the nanostructures) to a temperature above the phase change temperature to cause transition of these portions of the thermochromic material to the opaque state and thus induce the thermochromic material to scatter the light. As such, while scattering of the potentially harmful light is described primarily with respect to absorption of light by nanostructures, the potentially harmful light may be directly scattered by nanostructures. Further in this regard, while heating of the thermochromic material is described primarily with respect to absorption of light by nanostructures, scattering of light by nanostructures may also contribute to heating of the thermochromic material.

In some aspects, potentially harmful light refers to light having a frequency within a certain frequency range and having an irradiance above a threshold value. The frequency and threshold irradiance value may be application specific. In other words, what is considered potentially harmful light in, one application might not be considered potentially harmful light in another application. In this regard, the thermochromic material, the nanostructures in contact with the thermochromic material, and/or other components of the optical limiter device may be selected or configured (e.g., arranged, positioned) to respond to light that is considered to be potentially harmful for a given application. For example, in response to potentially harmful light, nanostructures may absorb the light and/or directly scatter the light. As an example, for applications that may benefit from protection from laser pointers (e.g., driving a vehicle such as flying an aircraft vehicle), the frequency may include any frequency within at least the visible-light spectrum.

The threshold irradiance value may be an irradiance value determined to cause harm (e.g., temporarily or permanently blind eyes, damage and/or saturate sensors) for a given application. In an aspect, the threshold value for the irradiance is generally selected to be above an irradiance associated with the Sun, which may be around 0.1 W/cm$^2$. In this regard, the optical limiter device is configured such that, in general, light from the Sun and other sources of ambient light are allowed through the optical limiter device and to the aperture. For example, depending on application, the threshold irradiance may be selected to be around 0.1 W/cm$^2$, 0.15 W/cm$^2$, 0.2 W/cm$^2$, 0.5 W/cm$^2$, 1 W/cm$^2$, 5 W/cm$^2$, and all values in between. It is noted that light may have multiple frequency components, with each frequency component having an irradiance value. Different frequencies may be associated with different irradiance thresholds. In some cases, alternatively or in addition to characterizing incident light using irradiance, light intensity and/or fluence may be utilized to characterize incident light.

A frequency response range and an irradiance threshold value may be customized in the optical limiter device depending on application requirements, including customizing (e.g., selecting) properties of the thermochromic material, nanostructures, and/or arrangement of these components. In some aspects, physical properties of the nanostructures, such as their material composition, size, and/or shape, can be designed and mixed to target a certain frequency or a combination of frequencies. In an embodiment, nanostructures of different material composition, sizes, and/or shapes may be provided in contact with the thermochromic material such that the nanostructures collectively provide resonances across wide and/or different frequency range(s).

The nanostructures provide frequency selectivity of the optical limiter device. The nanostructures may be configured with a frequency response range designed to encompass potential frequencies of light that may be used on the optical limiter device (e.g., as part of a laser attack). A frequency difference between a highest frequency and a lowest frequency of the frequency response range may be referred to as a bandwidth. A wider bandwidth may also be referred to as a wider spectral response range. In some cases, a resonant frequency range may encompass the visible-light spectrum (e.g., such as to protect from visible-light laser pointers) or portion thereof, infrared spectrum or portion thereof, and/or other portions of the electromagnetic spectrum. The nanostructures may be cubic, spherical, rod-shaped, plate-shaped, and/or other shapes. As an example, a spherical or plate-shaped nanostructure may be around 10 nm to 100 nm in diameter. In some cases, a nanostructure may be provided as a continuous layer of patterned material.

As such, the nanostructures may define a frequency response range of the optical limiter device such that incident light having a frequency within the frequency response range and an irradiance above a threshold is absorbed or scattered by at least a subset of the nanostructures. A subset of nanostructures that absorbs the incident light may generate heat sufficient to heat associated portions of the thermochromic material to a temperature above the phase change temperature. For a given nanostructure or group of nanostructures, the material composition, size, and shape of the nanostructure(s) may determine probabilistically whether the nanostructure(s) responds to the light by absorbing the light or scattering the light. In an aspect, the nanostructures predominantly facilitate scattering of potentially harmful light by absorbing the potentially harmful light and inducing corresponding portions of the thermochromic material to transition to the opaque state to scatter the potentially harmful light. Since frequency and wavelength are related, the frequency response range has an equivalent wavelength response range. In an aspect, the phrases frequency response range, wavelength response range, and spectral response range may be used interchangeably herein for discussion purposes.

In an aspect, thermal hotspots may be created at a lower threshold irradiance level (e.g., lower laser intensity and fluence) relative to a case in which nanostructures are not utilized. A thickness of the thermochromic material may be selected to effectuate the lower threshold irradiance level. In an aspect, the optical limiter device is implemented with a thin layer of thermochromic material, where a thinner thermochromic material is generally associated with a lower thermal mass and heats and cools faster relative to a thicker thermochromic material. For example, the thermochromic material may have a thickness approximately between 10 nm to 500 nm. Alternatively or in addition to utilizing a thin layer of thermochromic material, the positive feedback provided by absorption of the potentially harmful light by opaque portions of the thermochromic material may help effectuate a lower threshold irradiance level.

In some cases, small changes in the temperature of the thermochromic material can cause the thermochromic material to transition to the opaque state and scatter the potentially harmful light, thus facilitating faster response time to the potentially harmful light at lower illumination levels (e.g., irradiance levels). In an embodiment, the thermochromic material is a non-linear thermochromic material, which exhibits little or no reflective properties when at a temperature below the phase change temperature and exhibits high reflective properties at around the phase change temperature and above. In these cases, the optical limiter device may be referred to as having high sensitivity, since even light at lower illumination levels may be sufficient to cause the small change in the thermochromic material's temperature and thus cause the transitions to the transparent state to scatter the light.

Thus, using various embodiments, the optical limiter device may be configured to prevent light considered to be potentially harmful for a given application from reaching an aperture while allowing light not considered to be harmful to reach the aperture. In some embodiments, the optical limiter device provides wide bandwidth protection, high speed response to potentially harmful light, quick recovery from the potentially harmful light, and transparency for light that is not potentially harmful. Portions of the optical limiting device (e.g., portions of the thermochromic material) illuminated by the potentially harmful light effectively turn opaque in response to the light to prevent the light from reaching the aperture, whereas portions of the optical limiting device absent any potentially harmful light remain transparent and allow passage of light not considered potentially harmful. In this regard, scattering of the potentially harmful light may be performed without heating the entirety of the thermochromic material, where heating the entirety of the thermochromic material may cause the entirety of the thermochromic material to become opaque and take a longer duration of time than localized heating by the nanostructures as provided herein. Once the potentially harmful light is removed, the portions of the optical device that are in the opaque state transition back to the transparent state. The optical limiter device according to various embodiments utilizes a passive approach for selectively responding to light, which is in contrast to approaches that utilize bias circuitry and associated control circuitry for applying a bias signal to an optical limiter device in order to respond to light. Such a passive approach may allow for power savings and reduced complexity relative to approaches that utilize bias circuitry and associated control circuitry to generate and tune bias signals.

Referring now to the drawings, FIG. 1 illustrates an optical limiter device 100 for facilitating aperture protection in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

The optical limiter device 100 includes a thermochromic material 105, nanostructures in contact with the thermochromic material 105, a substrate layer 120, and an adhesive layer 125. As examples, nanostructures 110A, 110B, 110C, 110D, 110E, 110F, and 110G are labeled in FIG. 1. In FIG. 1, the nanostructures are interspersed on and/or throughout the thermochromic material 105 such that the nanostructures are in contact with the thermochromic material 105. As shown in FIG. 1, a nanostructure in contact with the thermochromic material 105 may be completely embedded in the thermochromic material 105 (e.g., the nanostructures 110B, 110E, 110F, and 110G), partially embedded in the thermochromic material 105 (e.g., the nanostructure 110A) such that a portion of the nanostructure is exposed (e.g., external to the thermochromic material 105), or on a surface of the thermochromic material 105 (e.g., the nanostructure 110C). As an example, the nanostructures 110A, 110B, 110C, 110D, and 110E are spherical. The nanostructures 110F and 110G have a rectangular cross-section and may have a shape of a rectangular prism or a cross for example.

The substrate layer 120 provides a first surface onto which the thermochromic material 105 is deposited and a second surface opposite the first surface onto which the adhesive layer 125 is deposited. The substrate layer 120 may provide structural support for the thermochromic material 105. For example, the substrate layer 120 may be a transparent substrate. For example, the substrate layer 120 may include glass and/or acrylic. A thickness of the substrate layer 120 is generally application dependent. For example, the substrate layer 120 may have a thickness in a range from several hundred microns to a millimeter in some cases.

The adhesive layer 125 is provided on the substrate layer 120 and may be utilized to facilitate engagement (e.g., coupling) of the optical limiter device 100 to a system to facilitate aperture protection of the system. In one case, when an automobile vehicle has an aperture 130, the adhesive layer 125 may be an adhesive peel-and-stick layer utilized to couple the optical limiter device 100 to a windshield of the automobile vehicle to selectively prevent light from propagating to the aperture 130. In this case, the aperture 130 may include eyes of a driver and/or a passenger(s) of the automobile vehicle. As an example, in FIG. 1, the adhesive layer 125 may couple the optical limiter device 100 to an inner surface of a windshield (e.g., surface closer to the driver and passenger(s)), such that the thermochromic material 105 faces toward the aperture 130 and away from an environment external to the automobile vehicle. This positioning of the thermochromic material 105 may help protect the thermochromic material 105 from the external environment. As another example, the adhesive layer 125 may couple the optical limiter device 100 to an outer surface of a windshield (e.g., surface farther from the driver and passenger(s)), such that the thermochromic material 105 faces toward the environment external to the automobile vehicle. The adhesive layer 125 may be disposed on other portions of the optical limiter device 100. For example, positioning of the adhesive layer 125 may be based on environmental considerations and/or structural considerations. Structural considerations may include shapes and/or dimensions of the optical limiter device 100 in relation to shapes and/or dimensions of the system onto which the optical limiter device 100 is to be engaged.

In some cases, the adhesive layer 125 may be optional. For example, alternative to or in addition to using the adhesive layer 125, the optical limiter device 100 may include one or more other types of engagement elements, such as nails, magnetics, suction cups, bumps and ridges, and/or generally any fasteners and/or fastening structure to facilitate engagement with the system. In some cases, engagement elements may be provided exclusively by the system onto which the optical limiter device 100 is to be engaged.

The optical limiter device 100 may include one or more protective layers. A protective layer may protect the optical limiter device 100 and/or the system to which the optical limiter device 100 is coupled. For example, the protective layer may be an environmental protective layer that includes polymer materials to protect the optical limiter device 100 from moisture. The protective layer may be in contact with the optical limiter device 100 or offset from the optical limiter device 100.

In some embodiments, the optical limiter device 100 selectively prevents potentially harmful light incident on the optical limiter device 100 from propagating through the optical limiter device 100 and reaching the aperture 130 through operation of the nanostructures and the thermochromic material 105. In an aspect, the optical limiter device 100 selectively prevents incident light from propagating through the optical limiter device 100 to the aperture 130 based on frequency components and associated irradiance values of the incident light. In this regard, the optical limiter device 100 determines that light incident on the optical limiter device 100 is potentially harmful light when the light has a frequency component within a certain frequency range and an irradiance above a threshold value. For example, the light may have a frequency within the visible-light spectrum and an irradiance above a threshold irradiance of 0.1 W/cm$^2$.

In some cases, the optical limiter device 100 has a thickness (e.g., vertical distance from a top surface of the adhesive layer 125 to a bottom surface of the thermochromic material 105 in FIG. 1) around or less than a few millimeters. In one case, the optical limiter device 100 has a thickness of 1 mm. A thickness of the substrate layer 120 may be around 1 mm. A thickness of the adhesive layer 125 may be approximately between 50 µm and 150 µm. A thickness of an active layer may be approximately between 100 nm and 200 nm. A thickness of the active layer may include the thickness of the thermochromic material 105 and a thickness of nanostructures (if any) that protrudes from the thermochromic material 105. Such thicknesses are provided by way of non-limiting examples, and other thicknesses may be utilized. Thicknesses and other dimensional aspects of the optical limiter device 100 and components thereof are dependent on application.

In an embodiment, as shown in FIG. 1, the optical limiter device 100 can be implemented (e.g., positioned) in front the aperture 130 to facilitate protection of the aperture 130. The aperture 130 may be, or may include, human eyes, an aperture of a sensor, and/or generally any opening that can receive electromagnetic (EM) radiation. EM radiation may generally refer to any radiation in the EM spectrum and may be referred to as an EM beam of radiation, EM beam, light, beam, or variant thereof (e.g., EM beam of light). The term light may include visible light, infrared light, ultraviolet light, or generally any portion of the EM spectrum.

In FIG. 1, light 135 incident on the optical limiter device 100 is not considered by the optical limiter device 100 to be potentially harmful, and thus the light 135 is passed through the optical limiter device 100 to the aperture 130. In this regard, the light 135 may have a frequency outside of a frequency response range of the nanostructures and/or an irradiance below a threshold value, and is thus allowed to propagate through the optical limiter device 100. For example, the light 135 may be ambient light, such as from the Sun, and/or any stray light. Although the light 135 is shown as parallel rays in FIG. 1, such a depiction is used to simplify the figure. Portions of the light 135 may propagate through the optical limiter device 100 via the thermochromic material 105, the nanostructures, the substrate layer 120, and the adhesive layer 125 to the aperture 130 from various angles. These rays of the light 135 are not depicted in FIG. 1 in order to avoid obscuring components of FIG. 1.

The light incident on the optical limiter device 100 may have multiple frequency components, with each frequency component having an irradiance value. In this case, the nanostructures may be excited in response to the frequency component(s) of the incident light within the frequency response range of the nanostructures and have an irradiance above a respective threshold, whereas the frequency component(s) of the incident light outside the frequency response range and/or having an irradiance below a respective threshold does not induce emission of photoelectrons. In some cases, different frequencies may be associated with different irradiance thresholds.

It is noted that FIG. 1 illustrates an example distribution and physical properties (e.g., size, shape) of the nanostructures in the thermochromic material 105 and that other manners by which to intersperse the nanostructures on and/or within the thermochromic material 105 may be utilized (e.g., dependent on application, costs, etc.). In this regard, the optical limiter device 100 may include a different arrangement of nanostructures in contact with the thermochromic material 105 than that shown in FIG. 1. For example, in some cases (not shown), all nanostructures may be completely embedded in the thermochromic material 105. In an aspect, nanostructures may be provided as part of a metamaterial layer (e.g., continuous metamaterial layer) having a nanopattern in contact with (e.g., on and/or within) the thermochromic material 105. In some cases, the metamaterial layer may be formed by depositing a layer of material (e.g., gold, silver) and patterning the layer.

In an embodiment, each nanostructure in contact with the thermochromic material 105 supports a resonance (e.g., a plasmon-polariton resonance) at a given frequency band (e.g., also referred to as a resonant frequency range) that is based on physical properties (e.g., material composition, size, shape) of the nanostructure and composition of the thermochromic material 105. The resonance gives rise to absorption of incident light and conversion of the luminous incident energy to heat via phonon-electron interactions in the nanostructures.

When the nanostructures are illuminated by potentially harmful light (e.g., light having an irradiance above a threshold), the light excites collective surface charge oscillations (e.g., oscillations of free electron charges) at an interface between each nanostructure and the thermochromic material 105. The oscillations of the nanostructures, in response to the incident light exceeding a given threshold value, give rise to absorption and/or scattering of at least a portion of the light by the nanostructures. The portion of the light that is absorbed by the nanostructures is transduced into heat by the nanostructures. Such heat generated by the nanostructures raises the temperature of the nanostructures and, through heat transfer mechanisms such as conduction, raises the temperature of a portion of the thermochromic material 105 in the vicinity (e.g., immediate vicinity) of the nanostructures.

In some aspects, coupling between nanostructures may facilitate absorption of potentially harmful light. In this regard, nanostructures of multiple sizes, shapes, and/or materials can be tethered or linked together to form molecules, attached to a polymer backbone, linked or tethered to form chains, and/or linked to form lattices. Such coupling is generally a function of a distance between nanostructures, in which a larger distance between any two nanostructures is associated with lower coupling between these two nanostructures. For example, an absorber structure is implemented by the nanostructures 110F and 110G. The nanostructures 110F and 110G may be positioned to couple to each other to facilitate heating of the portion of the thermochromic material 105 between and around the nanostructures 110F and 110G. While such coupling is shown along the vertical direction in FIG. 1, coupling may also occur horizontally (e.g., between the nanostructure 110F or 110G and one or more neighboring nanostructures to the right in FIG. 1) and/or with the spherical-shaped nanostructures based on distance between nanostructures. In FIG. 1, the nanostructure 110G is in contact with the substrate layer 120, whereas the nanostructure 110F is embedded in the thermochromic material 105. Similarly, the spherical-shaped nanostructures may couple with each other and/or with the non-spherical shaped nanostructures based on distance between the nanostructures.

Since the phase/state of the thermochromic material 105 is temperature dependent, the increase in the temperature of the thermochromic material 105 to a temperature above the phase change temperature in response to the heat from the nanostructures causes portions of the thermochromic material 105 in the vicinity of the nanostructures to transition from the transparent state to the opaque state. In this manner, the incident light causes nanostructures along the light's path to rise in temperature and associated transitioning of the thermochromic material 105 to the opaque state.

In an aspect, since the light causes localized heating of the thermochromic material 105, the reflective portion(s) of the thermochromic material 105 that are formed in portions of the optical limiter device 100 associated with the localized heating scatter the light, while other portions of the optical limiter device 100 allow light to pass through to the aperture 130. The portion(s) of the thermochromic material 105 in the reflective state scatters the incident light such that the light does not reach the aperture 130, thus reducing or eliminating transmission of the light through the optical limiter device 100 and preventing the light from reaching the aperture 130. The light that is allowed to reach the aperture 130 have a frequency outside of the resonant frequency range(s) collectively provided by the nanostructures in contact with the thermochromic material 105, and/or have irradiance less than threshold, and is generally considered to not be harmful for a given application.

In this regard, the aperture 130 (e.g., an operator of a system that includes or utilizes the optical limiter device 100, a sensor) can see light (e.g., not considered potentially harmful) that is transmitted through the transparent portions of the thermochromic material 105, while potentially harmful light that is incident on the opaque portions is scattered to protect the aperture 130. In an embodiment, material composition utilized to implement the thermochromic material 105 is selected such that, in its opaque state, the opaque portions of the thermochromic material 105 scatter frequency components of light at least within the resonant frequency range provided by the nanostructures. In some cases, dependent on the material composition of the thermochromic material 105, frequency components outside of the resonant frequency range may also be scattered by the opaque portions of the thermochromic material 105.

At higher nanostructure density/concentration (e.g., number of nanostructures per unit volume or per surface area), less potentially harmful light can penetrate the thermochromic material 105. For example, when the aperture 130 includes human eyes, the thermochromic material 105 prevents the light from traversing through the optical limiter device 100 and potentially blinding (e.g., temporarily or permanently) the eyes. When the aperture 130 includes a sensor, the thermochromic material 105 prevents the light from reaching the sensor and saturating and/or damaging the sensor.

The nanostructures continue to generate heat that maintains the thermochromic material 105 in the opaque state until illumination by potentially harmful light ends. Once the illumination ends, the temperatures of the nanostructures decrease. With the cooling of the nanostructures, the thermochromic material 105 decreases to a temperature below its phase change temperature and reverts to its transparent state. For example, the nanostructures and the thermochromic material 105 may revert to their original temperatures (e.g., their temperature when no potentially harmful light is incident on the thermochromic material 105). In an aspect, the reverting of the thermochromic material 105 to the transparent state may be referred to as recovery of the thermochromic material 105 or recovery of the optical limiter device 100. In this regard, the opaque portions of the thermochromic material 105 may be considered as transient scattering centers in the thermochromic material 105 that are induced by potentially harmful incident light and disappear once potentially harmful incident light is removed.

As such, operation of the optical limiter device 100 to create these scattering centers in response to potentially harmful light is reversible. In some cases, the opaque state may form in response to potentially harmful light in less than 1 µs of the light illuminating nanostructures, and revert to the transparent state in less than 1 µs upon removal of the potentially harmful light.

Properties (e.g., material composition, lattice structure) of the thermochromic material 105 are selected based on a target application. In an embodiment, the properties of the thermochromic material 105 are selected based on phase change temperature and reversibility (e.g., transitioning to and from the opaque state). In an aspect, in various applications, the phase change temperature is generally desired to be higher than ambient temperature (e.g., to avoid the thermochromic material 105 turning opaque in response to ambient temperature), while being low enough that the phase change temperature can be readily reached when potentially harmful light is incident on the optical limiter device 100. As an example, a material that has a phase change temperature of 30° C. may turn opaque in response to ambient light from the Sun, whereas a material that has a phase change temperature of 700° C. involves more heating to reach or exceed the phase change temperature and thus is generally associated with slower response time. In various applications, the thermochromic material 105 may have a phase change temperature approximately between 50° C. (323 K) and 100° C. (373 K).

As an example, the thermochromic material 105 may include vanadium dioxide ($VO_2$). $VO_2$ has a phase change temperature of around 68° C. (340 K). At temperatures below 68° C., $VO_2$ is a transparent insulator with a monoclinic crystal structure. At temperatures above 68° C., $VO_2$ is a reflective metal with a tetragonal crystal structure similar to rutile. In this regard, at around 68° C., the electrical conductivity of $VO_2$ increases by several orders of magnitude (e.g., increases by a factor of around $10^4$), thus transitioning $VO_2$ from an insulator to a metal. As such, the transparent state of $VO_2$ may be referred to as a transparent insulator state/phase or a monoclinic state/phase, and the opaque state of $VO_2$ may be referred to as a metal reflective state/phase or a rutile state/phase. The reflective nanocrystals formed in $VO_2$ when in the opaque state may be referred to as metal nanocrystals. In some cases, the bulk $VO_2$ may be doped, such as with tungsten (W). Dopants may be added to $VO_2$ to adjust (e.g., increase or decrease) the phase change temperature of $VO_2$. $VO_2$ may allow a duration of less than 1 µs for transitioning from the transparent state to the opaque state in response to potentially harmful light, and a duration of less than 1 µs for reverting from the opaque state to the transparent state. In some cases, $VO_2$ is utilized to implement the thermochromic material 105 in infrared applications. In visible-light applications, the thermochromic material 105 may include spiropyran for example. The foregoing provides non-limiting examples of the material composition of the thermochromic material 105. Other material compositions of the thermochromic material 105 may be utilized dependent on application.

In an embodiment, nanostructures of different material composition, sizes, and/or shapes may be provided in contact with the thermochromic material 105 such that the nanostructures collectively provide resonances across wide and/or different frequency range(s). In some cases, a resonant frequency range may encompass the visible-light spectrum (e.g., such as to protect from visible-light laser pointers), infrared spectrum, and/or other EM spectrum.

The nanostructures may include nanoparticles, nanopatterns (e.g., metamaterial layer), and/or other nanostructures such as nanotubes (e.g., carbon nanotubes) or nanowires (e.g., silver nanowires, gold nanowires), that can be used to locally heat the thermochromic material 105. In some aspects, the nanostructures may include electrically conductive material. By way of non-limiting example, the metal nanostructures may include gold, silver, other noble metals, aluminum, copper, and/or other metals. In some cases, they may include carbon nanotubes or titanium nitride (TiN) materials. The nanostructures may be cubic, spherical, rod-shaped, plate-shaped, cross-shaped, and/or other shapes. As an example, a spherical or plate-shaped nanostructure may be around 10 nm to 100 nm in diameter. In an aspect, such as shown in FIG. 1, the nanostructures (e.g., the nanostructure 110A) have core-shell structures. A core-shell structure may include a nanoparticle as its core and a shell enclosing the nanoparticle. As an example, the nanoparticle may be a dielectric material such as glass and the shell may be a metallic material such as gold or silver. In some cases, the core-shell structure may provide better scattering efficiency than nanoparticles without a shell. In an aspect, the nanostructures may include nanopatterns having metal/dielectric layers that can form various plasmonic resonators.

Figure 2A:
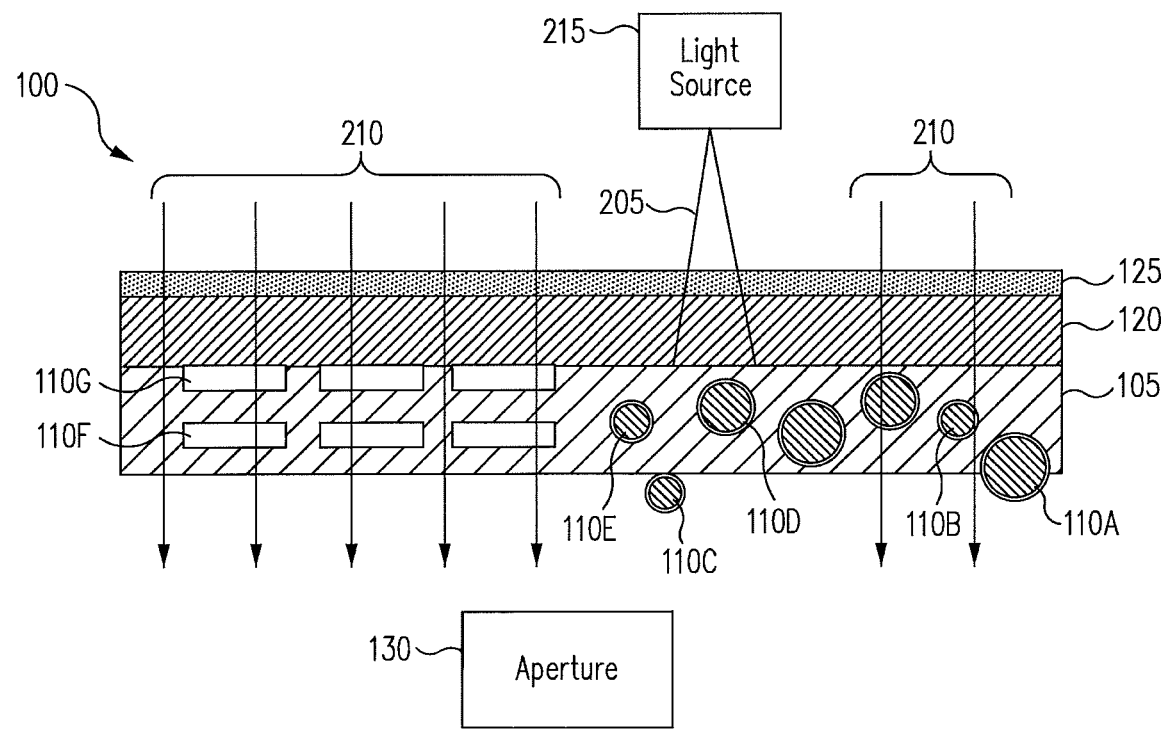
FIG. 2A illustrates light incident on the optical limiter device of FIG. 1 in accordance with one or more embodiments of the present disclosure.
Figure 2B:
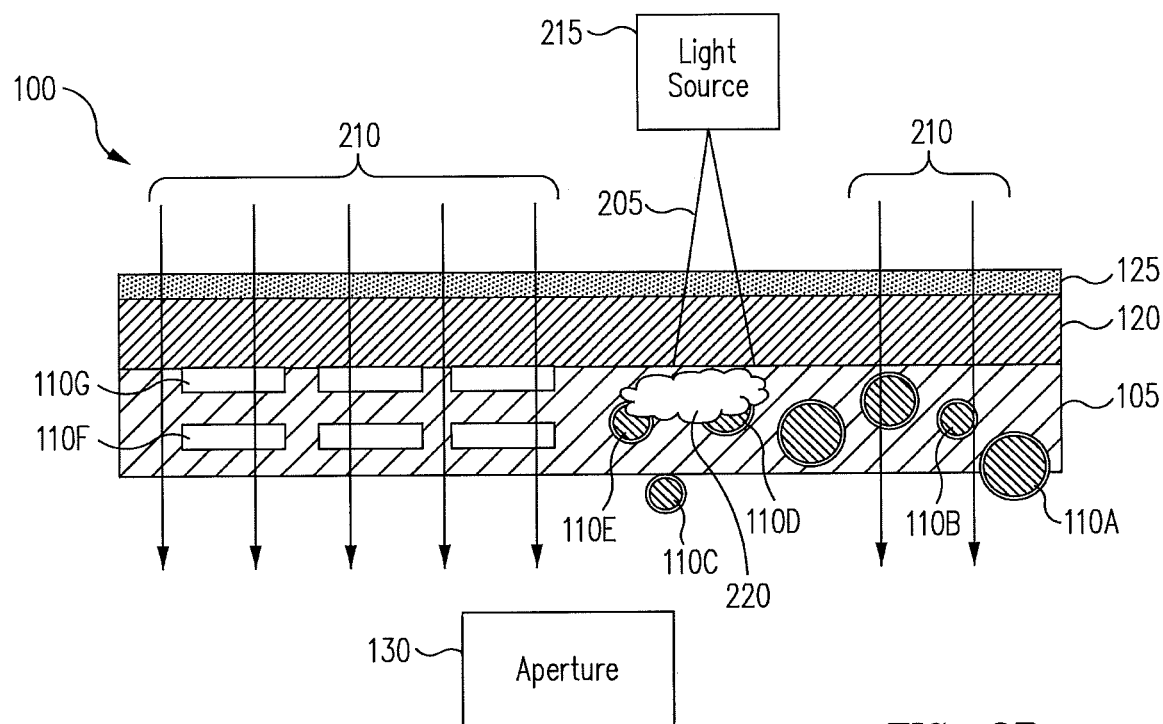
FIG. 2B illustrates a thermal hotspot formed in a thermochromic material of the optical limiter device of FIG. 1 in response to incident light in accordance with one or more embodiments of the present disclosure.

FIG. 2A illustrates light 205 and 210 incident on the optical limiter device 100 in accordance with one or more embodiments of the present disclosure. In this regard, the light 205 and 210 are incident on the thermochromic material 105 and a subset of the nanostructures in contact with the thermochromic material 105. FIG. 2B illustrates a thermal hotspot 220 formed in the thermochromic material 105 in response to the light 205 in accordance with one or more embodiments of the present disclosure. In FIGS. 2A and 2B, the light 210 propagates through the optical limiter device 100 to reach the aperture 130, whereas the light 205 is prevented from reaching the aperture 130 by an opaque portion(s) of the thermochromic material 105 formed at the thermal hotspot 220.

The light 205 has a frequency within a resonant frequency range associated with the nanostructures in contact with the thermochromic material 105 and an irradiance at or above a threshold value (e.g., 0.1 W/cm$^2$). By contrast, the light 210 may have a frequency outside of the resonant frequency range associated with the nanostructures in contact with the thermochromic material 105 and/or an irradiance below the threshold value, and is thus allowed to propagate through the optical limiter device 100 to reach the aperture 130. In this regard, the light 205 is considered to be potentially harmful light whereas the light 210 is considered to not be harmful. The light 205 is from a light source 215, such as a laser pointer or laser dazzler. The light 210 may include ambient light, such as from the Sun, and/or any stray light.

In FIG. 2B, the nanostructures in contact with the portion of the thermochromic material 105 illuminated by the light 205 generate heat to create the thermal hotspot 220 in the thermochromic material 105. For example, the thermal hotspot 220 may be created by heat generated at least by the nanostructures 110D and 110E. As the light 205 propagates through the thermochromic material 105, the nanostructures along the path of the light 205 may absorb the light 205 and transduce the absorbed light into heat that raises the temperature of the thermochromic material 105 local to these nanostructures.

The thermal hotspot 220 is a representation of heat generated by the nanostructures in response to the light 205.

The heat generated by the nanostructures is transferred to a portion of the thermochromic material 105 that corresponds spatially with the nanostructures. When the portion of the thermochromic material 105 is heated to a temperature above the phase change temperature of the thermochromic material 105, the portion of the thermochromic material 105 transitions from the transparent state to the opaque state. The light 205 incident on the opaque portion is scattered and thus prevented from reaching the aperture 130.

When the light 205 remains present, the light 205 continues to cause the nanostructures to generate heat and, in turn, cause the portion of the thermochromic material 105 to remain in the opaque state. In some cases, light having a frequency outside the resonant frequency range associated with the nanostructures of the optical limiter device 100 may be scattered by the opaque portion if such light is incident on the opaque portion. Such light may be scattered even though the nanostructures would normally allow such light to pass through (e.g., the light is not potentially harmful light). In this regard, the thermochromic material 105 (or portion thereof) in the opaque state has a frequency selectivity, which may be based on bulk material composition and dopants (if any) that compose the thermochromic material 105. A remaining portion of the optical limiter device 100 remains transparent and allows the light 210 (and other incident light not considered to be potentially harmful) to pass through the optical limiter device 100 even when the opaque portion(s) is present, thus allowing the aperture 130 to receive the light 210 via the optical limiter device 100 while protecting the aperture 130 from the light 205. For example, when the aperture 130 includes a pilot's eyes, the pilot can see through portions of the optical limiter device 100 not blocked by the opaque portion(s) of the thermochromic material 105 formed in response to the light 205.

One or more thermal hotspots in addition to the thermal hotspot 220 may be formed as the light 205 propagates through the thermochromic material 105. In this regard, any remaining portion of the light 205 that is not scattered by the opaque portion of the thermochromic material 105 formed by the thermal hotspot 220 may be scattered by subsequent opaque regions formed by subsequent thermal hotspots created as the remaining portion of the light 205 propagates through the thermochromic material 105. At higher nanostructure density/concentration (e.g., number of nanostructures per unit volume or per surface area), less of the light 205 can penetrate the nanostructures in contact with the thermochromic material 105 to reach the aperture 130.

In an aspect, additional factors may contribute to absorption of the light 205 and associated creation of thermal hotspots in response to such absorption. The opaqueness of the transitioned portion of the thermochromic material 105 facilitates absorption of the light 205 by this transitioned portion, thus providing a positive feedback mechanism to help expand the opaque portion and facilitate protection of the aperture 130 from the light 205. As facilitated by the positive feedback, the thermal hotspots may expand and (if the thermal hotspots are sufficiently close) coalesce with neighboring thermal hotspots to effectively form a continuous, reflective layer (e.g., a locally reflective mirror) that scatters the light 205. In some cases, coupling between nanostructures may facilitate absorption of potentially harmful light. Such coupling is generally a function of a distance between nanostructures, in which a larger distance between any two nanostructures is associated with lower coupling between these two nanostructures.

Properties of the light 205 may determine which of the nanostructures are excited in response to being illuminated by the light 205 and a corresponding size of the portion of the thermochromic material 105 transitioned to the opaque state by excitation of the nanostructures in response to the light 205. For example, the light 205 may be laser light (e.g., from a laser pointer) having a beam diameter of about 2 mm. A size of the thermal hotspot 220 may be on a similar order as the size of the light 205. Similarly, a size of the portion of the thermochromic material 105 that transitions to the opaque state may have a diameter of a few millimeters (e.g., sizes on the same order as the beam diameter associated with the light 205 in this example).

Figure 2C:
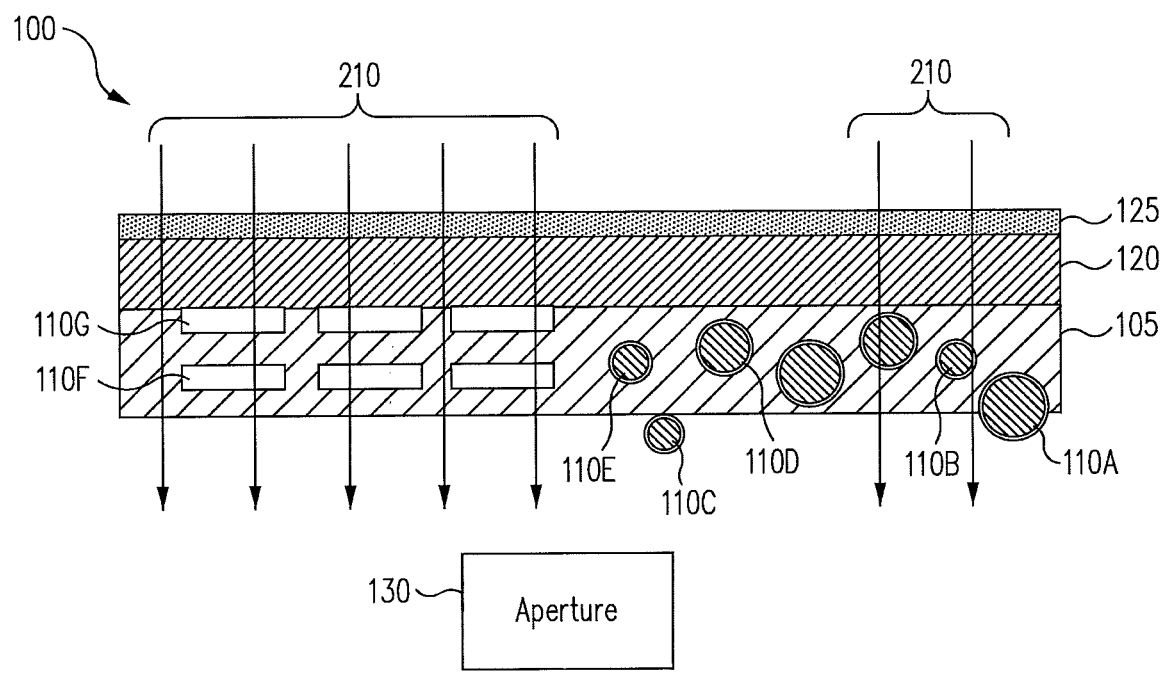
FIG. 2C illustrates a thermal hotspot having cooled down once incident light is removed in accordance with one or more embodiments of the present disclosure.

FIG. 2C illustrates the thermal hotspot 220 having cooled down once the light 205 is removed in accordance with one or more embodiments of the present disclosure. For example, the light 205 may be removed when the light source 215 is turned off. As the thermal hotspot 220 cools down, the opaque portion of the thermochromic material 105 cools down. Once a temperature of the opaque portion is below the phase change temperature, the opaque region of the thermochromic material 105 reverts to the transparent state. In some cases, the opaque portion may form in response to the light 205 in less than 1 μs of the light 205 illuminating the nanostructures, and revert to the transparent state in less than 1 μs upon removal of the light 205.

It is noted that the light 205 and 210 incident on the optical limiter device 100 may have multiple frequency components, with each frequency component having an irradiance value. In this case, the nanostructures in contact with the thermochromic material 105 may generate heat in response to the frequency components of the incident light that coincide with one or more resonant frequencies of the nanostructures and have an irradiance above a respective threshold. In some cases, different frequencies may be associated with different irradiance thresholds. The nanostructures allow frequency components of the incident light outside the resonant frequency or frequencies encompassed by the nanostructures and/or below the irradiance threshold to pass to the aperture 130.

Figure 3:
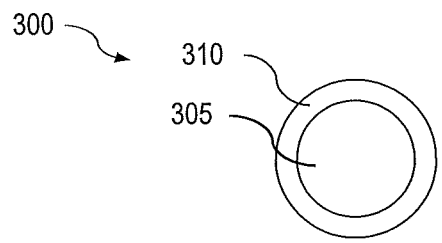
FIGS. 3 and 4 illustrates examples of a nanostructure in accordance with one or more embodiments of the present disclosure.

FIG. 3 illustrates an example of a nanostructure 300 in accordance with one or more embodiments of the present disclosure. In an embodiment, the nanostructure 300 may be one of the spherical-shaped nanostructures (e.g., 110A) illustrated in FIGS. 1 and 2A-2C. The nanostructure 300 includes a nanoparticle 305 (e.g., also referred to as a core) and a shell 310 (e.g., also referred to as a coating) encompassing the nanoparticle 305. The nanoparticle 305 may include silicon, germanium, gallium, arsenide, indium phosphide, cadmium selenide, zinc sulfide, other substances, and/or a combination thereof. The shell 310 may include gold, silver, titanium nitride, and/or other elemental or compound materials (e.g., metal alloys). In some cases, the shell 310 may be doped (e.g., with a metal, such as sodium or tin, or metal alloy). In one case, the nanoparticle 305 includes glass and the shell 310 includes gold. As an example, the nanostructure 300 may have a physical cross-section around 70 nm. In this example, the nanoparticle 305 may have a diameter of around 60 nm and the shell 310 may have a thickness of around 5 nm.

Figure 4:
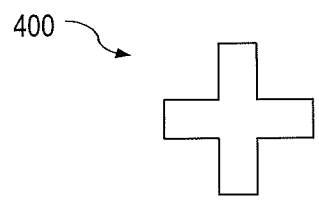

FIG. 4 illustrates an example of a nanostructure 400 in accordance with one or more embodiments of the present disclosure. The nanostructure 400 has a cross-shape. In an embodiment, the nanostructure 400 may be one of the non-spherical nanostructures (e.g., 110F) illustrated in FIGS. 1 and 2A-2C. In some cases, the nanostructure 400 may be provided alone or as part of an absorber structure to facilitate absorption and/or scattering of potentially harmful light. The nanostructure 400 may include gold, silver, titanium nitride, and/or other elemental or compound materials (e.g., metal alloys).

Figure 5A:
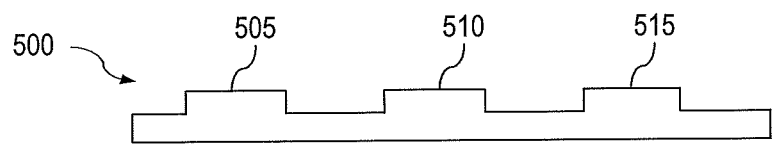
FIG. 5A illustrates a side view of an example of a metamaterial layer in accordance with one or more embodiments of the present disclosure.
Figure 5B:
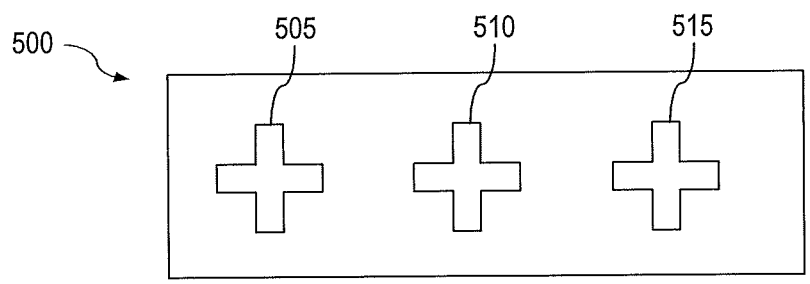
FIG. 5B illustrates a top view of the metamaterial layer of FIG. 5A in accordance with one or more embodiments of the present disclosure.

FIGS. 5A and 5B illustrates an example of a metamaterial layer 500 in accordance with one or more embodiments. In particular, FIGS. 5A and 5B illustrates a side view and a top view, respectively, of the metamaterial layer 500 (e.g., also referred to as a nanopattern). To form the metamaterial layer 500, a layer of material may be provided and patterned using lithography to define structures 505, 510, and 515. The layer of material may include gold, silver, titanium nitride, and/or other elemental or compound materials (e.g., metal alloys). In an embodiment, the metamaterial layer 500 may be provided in a thermochromic material, such as the thermochromic material 105 of FIG. 1. For example, with reference to FIG. 1, the metamaterial layer 500 may be disposed on a surface of the thermochromic material 105 and/or the substrate layer 120, and/or at least partially embedded in the thermochromic material 105. In some cases, a second metamaterial layer may be vertically displaced from the metamaterial layer 500 to form an absorber structure. While the structures 505, 510, and 515 are cross-shaped in FIGS. 5A and 5B, the structures 505, 510, and 515 may generally be any shape appropriate for effectuating a desired resonant frequency or resonant frequency range. The structures 505, 510, and 515 may be of different shapes and/or sizes. In an aspect, the metamaterial layer 500, each of the structures 505, 510, and 515, and generally any portion of the metamaterial layer 500 may be referred to as a nanostructure. The metamaterial layer 500 is a continuous layer of patterned material and may be considered a nanostructure provided as a continuous layer and/or nanostructures formed as part of a continuous layer.

In an embodiment, nanostructures, such as the nanostructures 300 and 400 and the metamaterial layer 500 (or portion thereof), are deposited on and/or interspersed throughout a thermochromic material (e.g., the thermochromic material 105). In some aspects, nanostructures of multiple sizes, shapes, and/or materials can be tethered or linked together to form molecules, attached to a polymer backbone, linked or tethered to form chains, and/or linked to form lattices. Such coupling between the nanostructures may facilitate absorption and/or scattering of potentially harmful light by the nanostructures.

Figure 6:
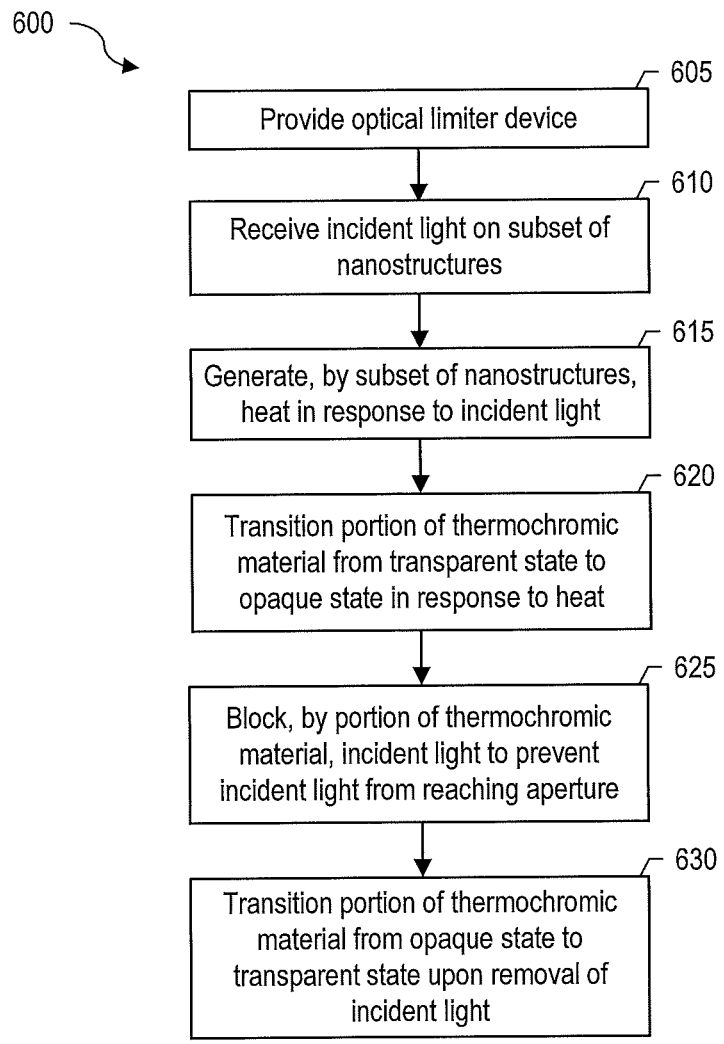
FIG. 6 illustrates a flow diagram of an example of a process for facilitating aperture protection in accordance with one or more embodiments of the present disclosure.

FIG. 6 illustrates a flow diagram of an example of a process 600 for facilitating aperture protection in accordance with one or more embodiments of the present disclosure. For explanatory purposes, the process 600 is described herein with reference to the optical limiter device 100 of FIGS. 1 and 2A-2C; however, the process 600 is not limited to the optical limiter device 100 of FIGS. 1 and 2A-2C. Note that one or more operations may be combined, omitted, and/or performed in a different order as desired.

At block 605, the optical limiter device 100 is provided as part of a system. The system may be, may include, or may be a part of, a vehicle (e.g., terrestrial, naval, aerial, and/or space vehicles), a sensor (e.g., radar sensor), a wearable device (e.g., glasses, goggle), a multi-functional structure (e.g., with one or more sensors embedded in the structure), a multi-functional aperture, and/or generally in any system in which aperture protection may be implemented. An example of a system is described with respect to FIG. 8.

At block 610, the light 205 and 210 are incident on at least a subset of nanostructures that are in contact with the thermochromic material 105. For example, the nanostructures may include nanostructures disposed on a surface of the thermochromic material 105 and/or nanostructures at least partially embedded in the thermochromic material 105 (e.g., the nanostructures 110D and 110E). The light 205 has a frequency within the resonant frequency range collectively provided by the nanostructures and an irradiance above a threshold value. The light 210 has a frequency outside the resonant frequency range and/or an irradiance below the threshold value and is transmitted through the thermochromic material 105.

At block 615, heat is generated by the subset of nanostructures in response to the light 205. In an aspect, the nanostructures generate heat by oscillating in response to the light 205. In this regard, the nanostructures may absorb the light 205 and transduce the light 205 into heat that raises the temperature of the nanostructures. For example, the nanostructures may transfer the heat (e.g., via conduction) to the thermochromic material 105 to create the thermal hotspot 220 indicative of a rise in temperature of the thermochromic material 105.

At block 620, a portion of the thermochromic material 105 transitions from a transparent state to an opaque state in response to the heat generated by the subset of nanostructures. In an aspect, to cause the transition, the heat generated by the subset of nanostructures heats the portion of the thermochromic material 105 to a temperature above the phase change temperature of the thermochromic material 105. In some cases, the opaqueness of the transitioned portion of the thermochromic material 105 may facilitate absorption of the light 205.

At block 625, the portion of the thermochromic material 105 that has transitioned to the opaque state blocks (e.g., reflects, scatters) the light 205 to prevent the light 205 from reaching the aperture 130. At block 630, the portion of the thermochromic material 105 transitions from the opaque state to the transparent state upon removal of the light 205. In this regard, when the light 205 is removed (e.g., as shown in FIG. 2C), the nanostructures decrease in temperature. The decrease in temperature of the nanostructures causes a decrease in temperature in the portion of the thermochromic material 105. When the portion of the thermochromic material 105 is at a temperature below the phase change temperature, the portion of the thermochromic material 105 transitions from the opaque state to the transparent state.

Figure 7:
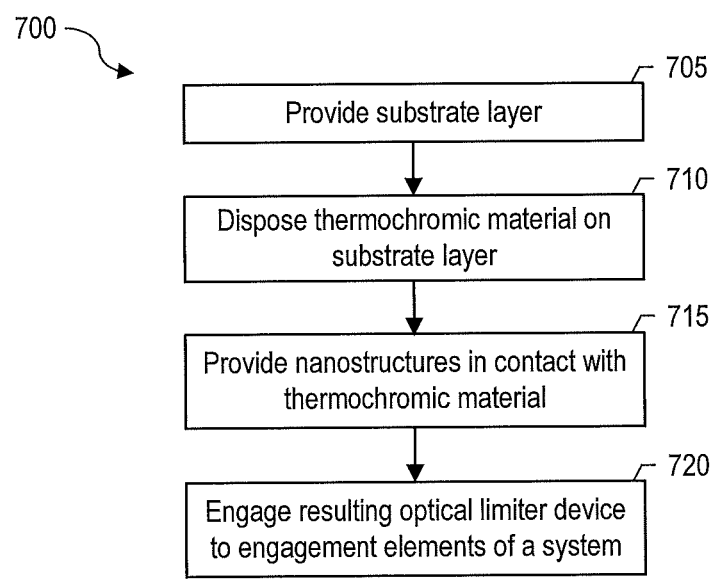
FIG. 7 illustrates a flow diagram of an example of a process for making a system for facilitating aperture protection in accordance with one or more embodiments of the present disclosure.

FIG. 7 illustrates a flow diagram of an example of a process 700 for making a system for facilitating aperture protection in accordance with one or more embodiments of the present disclosure. For explanatory purposes, the process 700 is described herein with reference to the optical limiter device 100 of FIG. 1; however, the process 700 is not limited to the optical limiter device 100 of FIG. 1. In an aspect, the process 700 may be implemented at block 605 of the process 600 of FIG. 6. Note that one or more operations may be combined, omitted, and/or performed in a different order as desired.

At block 705, the substrate layer 120 is provided. The substrate layer 120 may be a transparent substrate material, such as glass and/or acrylic. At block 710, the thermochromic material 105 is disposed on the substrate layer 120. For example, the thermochromic material 105 may be deposited on the substrate layer 120. In various applications, a material selected to implement the thermochromic material 105 may have a phase change temperature approximately between 50° C. (323 K) and 100° C. (373 K). The thermochromic material 105 may include $VO_2$ (e.g., for infrared applications) or spiropyran (e.g., for visible-light applications). At block 715, nanostructures are provided in contact with the thermochromic material 105. The nanostructures may be provided on a surface of the thermochromic material 105 and/or partially within the thermochromic material 105. In some cases, the nanostructures may be provided as the thermochromic material 105 is being deposited on the substrate layer 120. The nanostructures may include nanoparticles, core-shell structures, nanopatterns, and/or structures provided as part of a nanopattern. In some cases, nanostructures of different sizes, shapes, and/or material composition may be deposited on and/or interspersed throughout the thermochromic material 105, such as to effectuate a wide resonant frequency range. The optical limiter device 100 is formed by blocks 705, 710, and 715. In some cases, as part of forming the optical limiter device 100, the adhesive layer 125 is deposited on the substrate layer 120. The adhesive layer 125 may be deposited before or after the thermochromic material 105 has been deposited.

At block 720, the optical limiter device 100 is engaged to a component(s) of the system using one or more engagement elements. The optical limiter device 100 may provide a window structure to engage with these engagement elements. The engagement elements may include adhesives, nails, magnets, suction cups, bumps and ridges, and/or generally any fasteners and/or fastening structure that can support the optical limiter device 100 and/or couple the optical limiter device 100 to a component(s) of the system. As an example, an engagement element may include an adhesive peel-and-stick layer (e.g., the adhesive layer 125) of the optical limiter device 100 that can be applied to a structural support substrate of the system. The structural support substrate may include a transparent substrate composed of glass, quartz, polycarbonate, and/or other transparent material. For instance, the structural support substrate may include a windshield of an aircraft vehicle to which the optical limiter device 100 may be adhered using the adhesive layer 125. Alternatively and/or in addition, the engagement element may be provided by the system to receive the optical limiter device 100. In this regard, in some cases, the adhesive layer 125 is optional.

Figure 8:
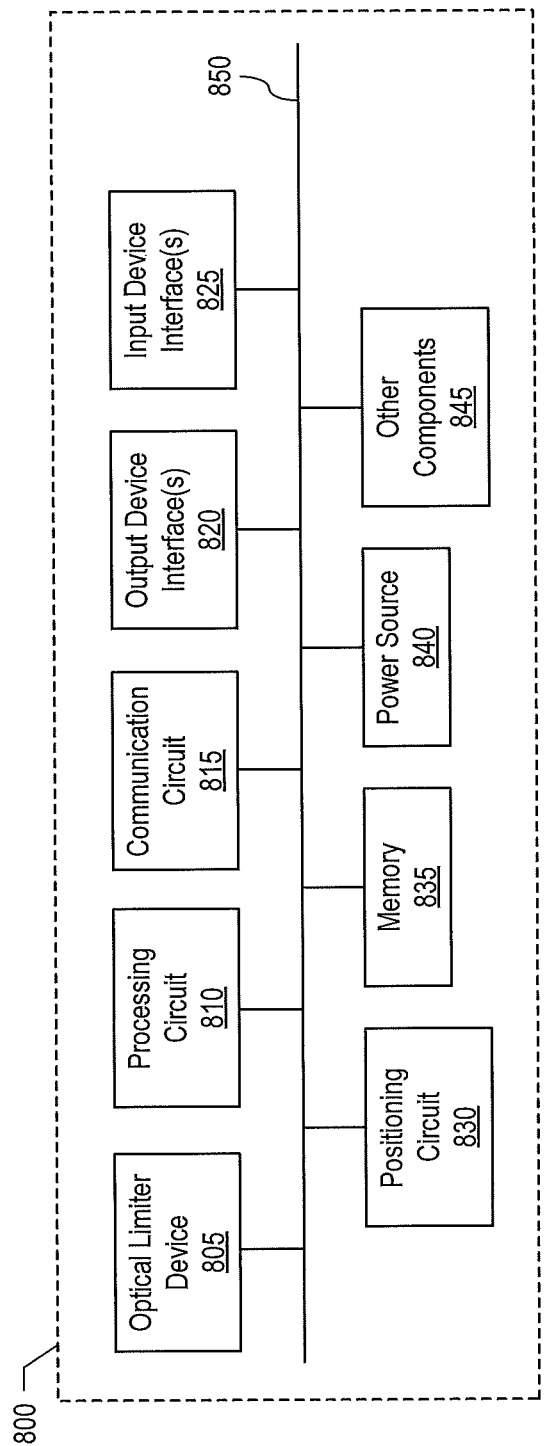
FIG. 8 illustrates a system with an optical limiter device for facilitating aperture protection in accordance with one or more embodiments of the present disclosure.

FIG. 8 illustrates a system 800 with an optical limiter device 805 for facilitating aperture protection in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 800 may be utilized in terrestrial, naval, aerial, and/or space applications with appropriate selection and configuration of components (e.g., operating frequencies, material composition, etc.). The system 800 may be, may include, or may be a part of a vehicle (e.g., automobile vehicle, aircraft vehicle, satellite), a sensor (e.g., infrared sensor), a multi-functional structure, a multi-functional aperture, or a wearable device (e.g., glasses, goggles). In an aspect, the dashed line in FIG. 8 may represent a housing of the system 800.

The system 800 includes an optical limiter device 805, a processing circuit 810, a communication circuit 815, one or more output device interfaces 820, one or more input device interfaces 825, a positioning circuit 830, a memory 835, a power source 840, other components 845, and a bus 850. The optical limiter device 805 may be utilized to prevent potentially harmful light from reaching apertures associated with the system 800. For example, when the system 800 is an aircraft vehicle, the apertures may include eyes of humans aboard the aircraft vehicle (e.g., passengers, pilot, etc.) and sensor equipment (e.g., infrared sensor equipment). In some cases, the optical limiter device 805 may be provided as a window of the system 800, or coupled to a window of the system 800. In an aspect, the system 800 may include multiple optical limiter devices, in which each optical limiter device may be used to protect one or more apertures.

In an embodiment, the optical limiter device 805 may be, may include, or may be a part of, the optical limiter device 100. As indicated above, depending on the system 800, the system 800 may additional components, different components, and/or fewer components than those shown in FIG. 8. For example, when the system 800 is implemented in a pair of glasses, the system 800 may include one optical limiter device coupled to each glass lens or placed in front of or behind each glass lens (e.g., without many of the components shown in FIG. 8).

The processing circuit 810 may execute machine readable instructions (e.g., software, firmware, or other instructions) stored in the memory 835. In this regard, the processing circuit 810 may perform any of various operations, processes, and techniques to facilitate operation of the system 800. For example, in an aircraft vehicle, the processing circuit 810 may facilitate operation of the aircraft vehicle, including flight of the aircraft vehicles and any mission-specific processes of the aircraft vehicles (e.g., radar applications, imaging applications, etc.). The processing circuit 810 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices. In an embodiment, in response to potentially harmful light, the processing circuit 810 may generate and transmit control signals to other components within the system 800 and/or other systems, such as to mitigate any damage caused by the light (e.g., turn on backup sensor equipment to replace sensor equipment damaged by the light), discover a source of the light, and/or remove the source of the light.

The communication circuit 815 may be configured to handle, manage, or otherwise facilitate wired and/or wireless communication between various components of the system 800 and between the system 800 and another system. In an embodiment, the communication circuit 815 may include a wireless communication circuit (e.g., based on the Institute of Electrical and Electronics Engineers (IEEE) 802.11 standard, Bluetooth™ standard, ZigBee™ standard, or other wireless communication standard), cellular circuit, or other appropriate communication circuit. In some cases, the communication circuit 815 may be configured for a proprietary wireless communication protocol and interface. The communication circuit 815 may include, or may be in communication with, an antenna for wireless communication. Thus, in one embodiment, the communication circuit 815 may handle, manage, or otherwise facilitate wireless communication by establishing a wireless link to a handheld device, base station, wireless router, hub, or other wireless networking device.

The communication circuit 815 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 815 may support proprietary wired communication protocols and interfaces. The communication circuit 815 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The output device interface(s) 820 may couple the system 800 to one or more output devices. The output device interface(s) 820 may include a graphics and/or audio driver card, graphics and/or audio driver chip, and/or graphics and/or audio driver processor. The output device(s) may enable the system 800 to provide output information to a user. For example, the output device(s) may include one or more display devices. The display device(s) may be utilized to display information to the user. For example, in response to potentially harmful light being incident on the optical limiter device 805, the display device(s) may provide information associated with the potentially harmful light. The information may include a potential position of an associated light source, images associated with a surrounding area (e.g., to facilitate detection and/or identification of additional threats), instructions for responding to the potentially harmful light and/or other threat, and/or prompts for requesting input from the user (e.g., prompt requesting the user to approve sounding an alarm). The display device(s) may include a flat screen display, a touch screen display, a light emitting diode (LED), or generally any device that may convey information visually.

The input device interface(s) 825 may couple the system 800 to one or more input devices. The input device(s) may enable the user to provide (e.g., enter) data and commands to the system 800. The input device(s) may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the system 800. In this regard, the user input may be received in any form, such as audio (e.g., speech), visual, and/or tactile. In some cases, the input device(s) may be integrated with and may also be a part of a display, such as in a touch screen display.

The positioning circuit 830 may be utilized to monitor a position of the system 800. The positioning circuit 830 may include, or may be in communication with (e.g., via the communication circuit 815), a global positioning system (GPS) that provides the position of the system 800.

The memory 835 may be utilized to store information for facilitating operation of system 800. By way of non-limiting example, the memory 835 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 835 may include volatile memory, such as random-access memory (RAM), dynamic RAM (DRAM), static RAM (SRAM), etc. The memory 835 may store information such as instructions to be executed by the various components (e.g., the processing circuit 810) of the system 800, buffered information to be transmitted (e.g., by the communication circuit 815), and/or other information. In some cases, the memory 835 may store information such as instructions to be executed in response to potentially harmful light.

The power source 840 may supply power to operate the system 800, such as by supplying power the various components of the system 800. The power source 840 may be, or may include, one or more batteries (e.g., rechargeable batteries, non-rechargeable batteries). Alternatively or in addition, the power source 840 may be, or may include, one or more solar cells. The solar cells may be utilized to supply power to operate the system 800 and/or to charge one or more rechargeable batteries.

In addition, the system 800 may include other components 845. By way of non-limiting example, the other components 845 may be used to implement any features of the system 800 as may be desired for various applications (e.g., radar imaging applications, surveillance applications, delivery applications, construction applications, etc.). The bus 850 may be utilized to facilitate communication of data between the various components of the system 800.

It is noted that dimensional aspects (e.g., thickness of thermochromic material, diameter of core-shell structure) provided above are by way of non-limiting example and are generally application dependent. Furthermore, as would be appreciated, such dimensional aspects are generally nominal values and are associated with dimensional tolerances.

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

What is claimed is:

1. A system for facilitating aperture protection, the system comprising:
   an optical limiter device having a threshold irradiance in a range between around 0.1 W/cm$^2$ and around 5 W/cm$^2$, wherein the optical limiter device comprises:
   a plurality of nanostructures, wherein at least a subset of the plurality of nanostructures is configured to:
      receive incident light; and
      generate heat by oscillating in response to the incident light when the incident light has an irradiance above the threshold irradiance; and
   a thermochromic material, wherein:
      the thermochromic material is a continuous layer having a thickness between around 10 nm and around 500 nm,
      each of the plurality of nanostructures is at least partially embedded in the thermochromic material,
      a first portion of the thermochromic material is configured to:
         transition from a first state to a second state in response to the heat generated by the subset of the plurality of nanostructures; and block the incident light when the first portion of the thermochromic material is in the second state by absorbing the incident light; and a second portion of the thermochromic material is configured to transition from the first state to the second state in response to absorption of the incident light by the first portion.

2. The system of claim 1, wherein the subset of the plurality of nanostructures is configured to generate the heat by oscillating in response to the incident light when the incident light has a frequency within a frequency range and has an irradiance above the threshold irradiance.

3. The system of claim 2, wherein the threshold irradiance and the frequency range are based at least in part on a physical property of the plurality of nanostructures.

4. The system of claim 1, wherein, when the first portion of the thermochromic material is in the second state, the first portion of the thermochromic material is configured to block the incident light further by scattering the incident light, and wherein the first portion of the thermochromic material is configured to transition from the first state to the second state in a duration of less than 1 µs.

5. The system of claim 1, further comprising a substrate layer in contact with the thermochromic material, wherein the first portion of the thermochromic material is configured to:

transition from the first state to the second state when the heat increases the first portion of the thermochromic material to a temperature above a threshold temperature; and transition from the second state to the first state when the first portion of the thermochromic material decreases to a temperature below the threshold temperature.

6. The system of claim 1, wherein at least one of the plurality of nanostructures comprises a core and a shell encompassing the core.

7. The system of claim 1, wherein the plurality of nanostructures form part of a continuous metamaterial layer, and wherein the continuous metamaterial layer is in contact with the thermochromic material.

8. The system of claim 1, wherein the system is a vehicle, a sensor, or a wearable device, wherein the first portion of the thermochromic material is configured to block the incident light when the first portion of the thermochromic material is in the second state to prevent the incident light from reaching one or more operators of the system and/or one or more components of the system.

9. The system of claim 8, wherein:
the system is an aircraft vehicle;
the system further comprises:
a housing; and
one or more engagement elements coupled to the housing and configured to receive the optical limiter device; and
the optical limiter device is configured to engage with the one or more engagement elements and selectively pass light into the aircraft vehicle.

10. A method of making the system of claim 1, the method comprising:
providing a substrate layer;
disposing the thermochromic material on the substrate layer;
providing the plurality of nanostructures such that each of the plurality of nanostructures is in contact with the thermochromic material; and engaging the optical limiter device with one or more engagement elements configured to receive the optical limiter device.

11. The method of claim 10, wherein the providing the plurality of nanostructures comprises distributing the plurality of nanostructures throughout the thermochromic material such that each of the plurality of nanostructures is at least partially embedded in the thermochromic material.

12. The method of claim 10, wherein the providing the plurality of nanostructures comprises forming a continuous metamaterial layer that comprises the plurality of nanostructures.

13. A method for facilitating aperture protection using an optical limiter device, the method comprising:

receiving, by at least a subset of a plurality of nanostructures of the optical limiter device, incident light, wherein each of the plurality of nanostructures is at least partially embedded in a thermochromic material of the optical limiter device, wherein the thermochromic material is a continuous layer having a thickness between around 10 nm and around 500 nm, and wherein the optical limiter device has a threshold irradiance in a range between around 0.1 W/cm$^2$ and around 5 W/cm$^2$;

generating, by the subset of the plurality of nanostructures, heat by oscillating in response to the incident light when the incident light has an irradiance above the threshold irradiance;

transitioning a first portion of the thermochromic material from a first state to a second state in response to the heat generated by the subset of the plurality of nanostructures;

blocking, by the first portion of the thermochromic material, the incident light when the first portion of the thermochromic material is in the second state by absorbing the incident light; and transitioning a second portion of the thermochromic material from the first state to the second state in response to the absorbing the incident light by the first portion.

14. The method of claim 13, wherein the heat is generated in response to the incident light when the incident light has a wavelength within a wavelength range and has an irradiance above the threshold irradiance.

15. The method of claim 14, further comprising, while the first portion is in the second state, passing, through a third portion of the thermochromic material that is separate from the first portion and the second portion and extends through an entire thickness of the thermochromic material, light having a wavelength outside the wavelength range and/or having less than the threshold irradiance.

16. The method of claim 13, wherein the first portion of the thermochromic material transitions from the first state to the second state when the heat increases the first portion of the thermochromic material to a temperature above a threshold temperature, the method further comprising transitioning the first portion from the second state to the first state when the first portion of the thermochromic material decreases to a temperature below the threshold temperature, wherein the generating the heat is based in part on coupling between at least two nanostructures among the subset.

17. The method of claim 13, wherein at least one of the plurality of nanostructures comprises a core and a shell encompassing the core, and wherein the transitioning the first portion occurs in a duration of less than 1 µs.

18. The method of claim 13, wherein the plurality of nanostructures form part of a continuous metamaterial layer, wherein the continuous metamaterial layer is in contact with the thermochromic material, and wherein the plurality of nanostructures comprises a plurality of cross-shaped nanostructures.

19. The system of claim 6, wherein the shell comprises a metal material, and wherein the core comprises a semiconductor material.

20. The system of claim 19, wherein the shell further comprises dopants in the metal material, and wherein the thermochromic material is vanadium dioxide or spiropyran.

* * * * *